UNITED STATES PATENT OFFICE.

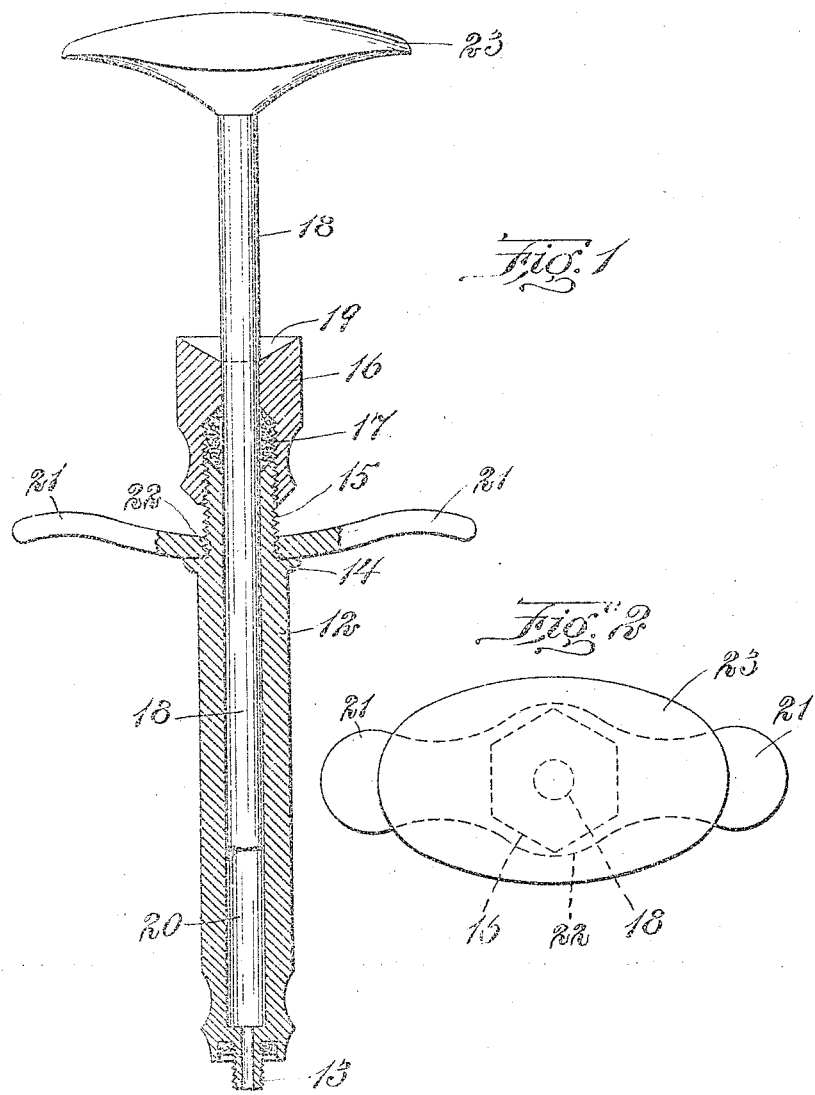

JOHN WILSON, OF BELMONT, MASSACHUSETTS, ASSIGNOR TO THE RANDALL-FAICHNEY COMPANY, OF BOSTON, MASSACHUSETTS, A CORPORATION OF MASSACHUSETTS.

SYRINGE.

No. 880,433.　　Specification of Letters Patent.　　Patented Feb. 25, 1908.

Application filed March 15, 1906. Serial No. 306,104.

*To all whom it may concern:*

Be it known that I, JOHN WILSON, of Belmont, in the county of Middlesex and State of Massachusetts, have invented certain new and useful Improvements in Syringes, of which the following is a specification.

This invention relates to dental syringes, and has for its object, first: to provide a syringe adapted to be conveniently charged with a liquid to be expelled from the syringe, and, secondly: to provide means whereby a dental syringe may be operated with greater ease and less discomfort to the operator's hand than heretofore.

The invention consists in the improvements which I will now proceed to describe and claim.

Of the accompany drawings, forming a part of this specification,—Figure 1 represents a longitudinal section of a syringe barrel embodying my invention, the piston being shown in elevation. Fig. 2 represents an end view of the syringe.

The same letters of reference indicate the same parts in all the figures.

The barrel of my improved syringe comprises a body portion 12 having a contracted delivering nozzle 13 at one end, its other or upper end being reduced to form a shoulder 14, and provided with an external screw thread 15. 16 represents a packing nut internally screw threaded at one end to engage the thread 15, and provided with a compressible packing 17, closely fitting the piston 18. The outer end of the nut 16 is provided with a tapered throat 19. The chamber 20 of the barrel is of uniform diameter from the throat 19 to the nozzle 13, and the piston is correspondingly formed so that the piston can be entirely withdrawn from the barrel to permit a liquid to be poured into the chamber through the inner end of the barrel. It will be seen that the tapered throat 19 acts as a funnel to facilitate the introduction of liquid into the chamber.

21—21 represent finger rests projecting from opposite sides of the barrel, said rests being preferably formed in a single piece, which includes a central apertured portion 22, which is internally threaded to engage the external thread 15, the said central portion being seated upon the shoulder 14 when in place.

The piston is provided with a head 23, which is of elliptical form, and is provided with a convex outer surface adapted to bear upon the palm of the operator's hand when the device is in use. The elliptical form of the head enables the syringe to be manipulated with greater convenience and less discomfort to the operator than would be involved if the head were circular as heretofore. When the device is in use, the major axis of the head furnishes an extended bearing on the palm of the operator's hand. The elliptical form of the head gives it a sufficiently extended bearing on the portion of the palm which exerts pressure on the head, without being so wide as to cause discomfort. The major axis of the elliptical head extends crosswise of the operator's hand, so that the palm in closing on the head is curved across the shorter axis of the latter.

I claim:

A syringe comprising a barrel having a body portion furnished with an external screw thread at its upper end, a nut internally threaded to engage said screw thread and provided with a tapered throat to facilitate the introduction of liquid into the barrel, packing between the nut and the end of the body portion, and a piston adapted to be removed through the nut.

In testimony whereof I have affixed my signature, in presence of two witnesses.

JOHN WILSON.

Witnesses:
　WILLIAM A. RANDALL,
　C. F. BROWN.